No. 607,142. Patented July 12, 1898.
F. STIENEN.
BICYCLE LOCK.
(Application filed Sept. 20, 1897.)
(No Model.)
Fig. 1.
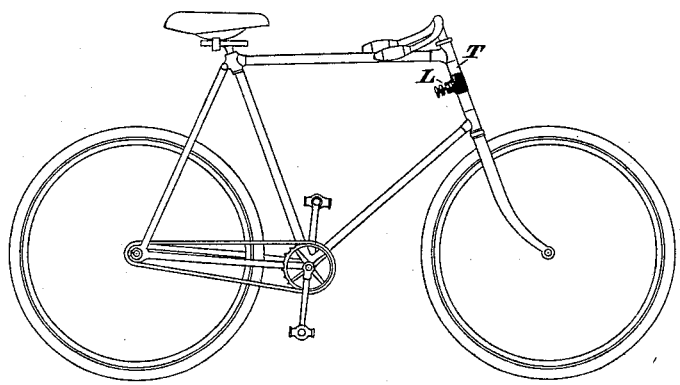
Fig. 2.     Fig. 3.
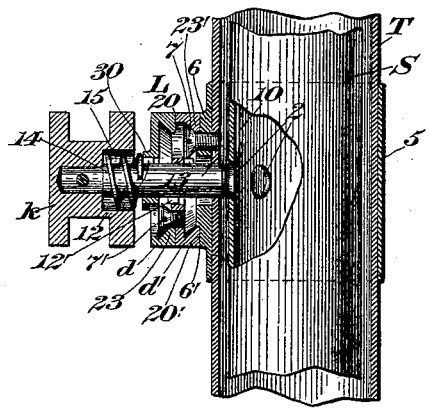 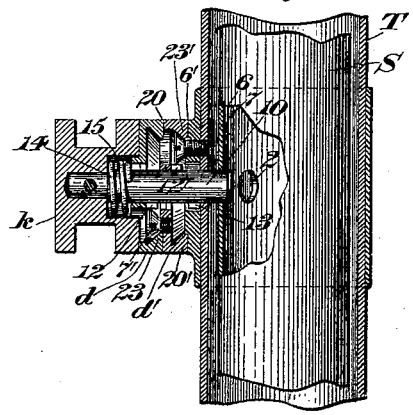
Fig. 4.   Fig. 5.   Fig. 6.
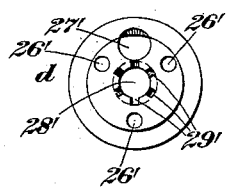 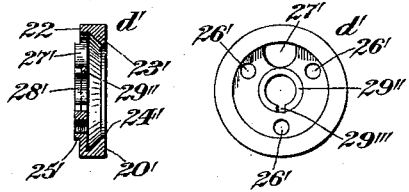 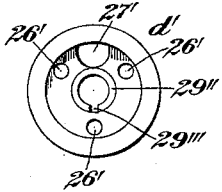
Fig. 7.
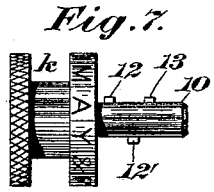
Witnesses
Chas. F. Schmelz
J. L. Edwards Jr.
Inventor
Ferdinand Stienen,
By his Attorney
F. H. Richards.
THE NORRIS PETERS CO., PHOTO-LITHO., WASHINGTON, D. C.

UNITED STATES PATENT OFFICE.

FERDINAND STIENEN, OF MIDDLETOWN, CONNECTICUT.

BICYCLE-LOCK.

SPECIFICATION forming part of Letters Patent No. 607,142, dated July 12, 1898.

Application filed September 20, 1897. Serial No. 652,212. (No model.)

*To all whom it may concern:*

Be it known that I, FERDINAND STIENEN, a citizen of the United States, residing at Middletown, in the county of Middlesex and State of Connecticut, have invented certain new and useful Improvements in Velocipede or Bicycle Locks, of which the following is a specification.

This invention relates to improvements in velocipede or bicycle locks; and it has for its main object the provision of an improved device of this class by means of which the steering-head of a bicycle may be locked securely to the steering-head tube in which it is mounted.

As it is well known that many of the locks now in use for the purpose of securing the moving part of a bicycle to a fixed portion of the frame are easily unlocked or removed from the bicycle by many simple forms of keys, I deem it desirable to make use of a lock in which it will be more difficult to release the lock-bolt than has heretofore been the case, and hence I have illustrated in the drawings of this application as an essential feature of my invention an improved combination-lock in which the lock-bolt cannot be released unless the proper combination is known.

In the drawings accompanying and forming part of this specification, Figure 1 is a side elevation of a bicycle having my improved lock applied thereto. Fig. 2 is an enlarged sectional detail of a portion of the steering-head and the steering-head tube, illustrating my improved lock with the lock-bolt released from the steering-head. Fig. 3 is a similar view illustrating the locked positions of the parts, with the lock-bolt projected through a recess in the steering-head. Fig. 4 is a detail front elevation of one of the disks of the lock. Fig. 5 is a transverse section of the same. Fig. 6 is a detail rear elevation of the same, and Fig. 7 is a side elevation of the lock-bolt and its bearing-knob.

Similar characters designate like parts in all the figures of the drawings.

The steering-head tube is designated by T and the steering-head by S, and both of these may be of any suitable or usual type. The steering-head tube carries the lock proper, which is designated in a general way by L, and the steering-head forms a keeper for the lock-bolt, said steering-head having in the present instance a plurality of holding-recesses 2, into any one of which the end of the lock-bolt may be projected to secure the head to the steering-head tube. It will be noticed that when several of these recesses 2 are employed the lock-bolt may be projected into one of them quickly without having to turn the steering-head to a single predetermined position. Hence the locking of the head and the steering-head tube may be effected much more easily and quickly than when the steering-head has a single holding-recess.

The lock that I employ may be carried by the steering-head tube in any suitable manner, and preferably will be secured to the steering-head tube in such a way that it cannot be readily removed without disassembling the machine. In the present instance the main frame of the lock is in the form of a sleeve 5, which may be screwed or brazed to the steering-head tube, this sleeve having at one side thereof a projecting boss 6, bored substantially centrally to permit the lock-bolt to pass therethrough, and it also has an annular bearing-face 6', on which one of the disks of the lock is mounted for rotation. In this case the sleeve 5 is secured to the steering-head tube by a screw 7, passing through the boss 6 and also serving as a means for holding the adjacent disk against the bearing-face 6'.

The lock that I have illustrated herein embodies a plurality of disks having suitable notches for releasing-studs on the bolt, and a spring-released lock-bolt having a bearing-knob for turning the bolt. The lock-bolt and the knob are secured together in any suitable manner and are clearly illustrated in Fig. 7, in which the knob is designated by $k$ and the bolt by 10. This lock-bolt has a pair of releasing-studs 12 and 12' and also has a holding-stud 13 for the purpose of limiting the longitudinal movement of the bolt. As before stated, this lock-bolt is intended to be released by the spring, and the spring that is employed herein is illustrated at 14 as a helical one working between the inner end wall of a recess 15 in the knob and the outer face of the outer disk of the lock-bolt.

Any suitable number of disks may be employed; but in the drawings only two are illustrated, this being deemed sufficient to properly protect the lock without rendering it unnecessarily complicated. The two disks shown are designated, respectively, by $d$ and $d'$ and are substantially similar in construction. Both of them have annular bearing-faces, which bearing-faces are designated by 20 and 20', respectively, the bearing-face 20 engaging a corresponding annular bearing-face 22 of the disk $d'$, while the bearing-face 20' engages the similar bearing-face 6' on the boss 6. Each of the disks $d$ and $d'$ also has an internal annular flange for the purpose of enabling it to be held in contact with the next adjacent disk or the boss 6, as the case may be, for the purpose of permitting the disks to rotate freely on one another and on the boss by which they are carried. Preferably these annular flanges, which are designated herein by 23 and 23', have beveled faces terminating in straight shoulders, such as shown at 24', Fig. 5, and formed by countersinking. Each of these shoulders is intended to abut against a corresponding projecting annular shoulder on the adjacent disk or boss, such a projecting shoulder being illustrated at 25', Fig. 5. The two disks $d$ and $d'$ may be connected with each other and with the boss 6 by means of screws, such as 7 and 7', having taper-heads corresponding to the taper of the beveled inner faces of the internal annular flanges of the disks. The screws 7 engage the bevel-face of the disk $d'$ and hold said disk in position upon the boss 6, while the screws 7', which are fastened into the disk $d'$, have their taper-heads in contact with the corresponding bevel-face of the disk $d$. Three of these screws are employed in the present case for securing the disk $d'$ to the boss 6, and a similar number for securing the disk $d$ to the disk $d'$.

The screw-holes in the disk $d'$ are shown at 26'. In order that the parts may be properly assembled, I have also shown in each disk a large opening, such as illustrated at 27', Figs. 4, 5, and 6, the diameter of this opening being somewhat greater than that of the heads of the screws 7 and 7'. When the disk $d$ is secured to the disk $d'$ or the disk $d'$ to the boss 6, which, it should be understood, has screw-holes similar to those shown at 26', the screws are first passed through the large opening, such as 27', and the disk turned until such large opening registers with a screw-hole in the part to which such disk is to be secured. After one screw is in place the disk will be turned until the large opening therein registers with another screw-hole, and the second screw will be inserted and the disk turned again to bring such large opening into registration with the third screw-hole, when the third screw will also be inserted. Of course the two disks will be secured to each other in substantially the same manner as the disk $d'$ is secured to the boss 6.

In addition to the openings previously referred to each of the disks has a central bore, such as 28', intersected by a suitable notch. The opening 28' is of the same diameter as the cylindrical bolt 10, so as to permit rotation of the disks on the bolt, and the notches are so positioned as to permit the releasing-stops on the lock-bolt to pass therethrough when the lock-bolt is disengaged from the steering-head. Obviously only one such notch is necessary for each disk; but as I deem it desirable to employ means for changing the combination of the lock each disk has a plurality of notches—in the present case, six in number—such, for example, as those designated by 29', Fig. 4. A countersunk bore in each disk is adapted to receive a split ring, such as 29'', having a notch, such as 29''', which, when the ring is turned away, may be brought opposite any one of the notches in the disk to alter the combination at will. Hence my improved device also forms a changeable combination-lock in which the combination may be altered when desired by simply turning the ring, such as 29'', in the countersink in the disk.

The disk $d$ is slightly different in construction from the disk $d'$, in that it has no screw-holes, such as those shown at 26', and has an annular shoulder 30 of a diameter corresponding to the internal diameter of the recess 14 in the knob. Hence it will be evident, especially by referring to Fig. 3, that all of the parts of the device are so constructed that when locked they form a substantially unitary structure with all of the working parts completely inclosed.

The disks $d$ and $d'$ and the knob $k$ may have on the peripheries thereof letters, numbers, or other similar characters by means of which a combination may be formed, and it will be understood that the location of the several studs on the bolt may be varied, as desired, for different combinations.

It will be noticed by reference to Fig. 2 that when the parts are unlocked the disks cannot be turned on the bolt, as the studs of the latter are then in engagement with the walls of the notches in the disks, while when the parts are locked these studs will lie between the flat web portions of the disks, as shown in Fig. 3, so that the disks may be turned freely.

To lock the steering-head to the steering-head tube, it is only necessary to bring the lock-bolt opposite one of the recesses 2 and then press in the knob and turn the disks, when the parts will be locked in place.

To release the bolt from the steering-head, the disks and the knob should be turned by hand to form the proper combination, when the releasing-studs will be in alinement with the notches in the disks and the bolt will be retracted by the action of the spring.

Having described my invention, I claim—

1. A combination-lock for velocipedes, said lock embodying a spring-released lock-bolt; a fixed member having an annular bearing-face; a pair of disks the inner one of which also has an annular bearing-face, and both of which have internal annular flanges and also notches for releasing-studs on the bolt, one of said disks having a plurality of said notches; a notched ring carried by said last-mentioned disk and settable to uncover any one of said notches of said disk; holding-screws carried by said fixed member and the inner one of the disks and having heads for engaging, respectively, the annular flange of each next succeeding disk and permitting the rotation of such disk; and a plurality of releasing and stopping studs on the lock-bolt.

2. A combination-lock for velocipedes, said lock embodying a spring-released lock-bolt; a fixed member having an annular bearing-face; a pair of disks the inner one of which also has an annular bearing-face and both of which have internal annular flanges and also notches for releasing-studs on the bolt; holding-screws carried by said fixed member and the inner disk and having heads for engaging, respectively, the annular flange of each next succeeding disk and permitting the rotation of said disk; and a plurality of releasing and stopping studs on the lock-bolt.

FERDINAND STIENEN.

Witnesses:
F. N. CHASE,
FRED. J. DOLE.